3,297,743
POLYCYANOVINYLCYANAMIDES AND THEIR
PREPARATION
Elwood P. Blanchard, Jr., Wilmington, Del., assignor to
E. I. du Pont de Nemours and Company, Wilmington,
Del., a corporation of Delaware
No Drawing. Filed Dec. 2, 1964, Ser. No. 415,466
26 Claims. (Cl. 260—465.5)

This application is a continuation-in-part of my copending application Serial No. 145,976, filed October 18, 1961, and now abandoned.

The present invention is concerned with, and has as its principal objects provision of, a novel class of substituted cyanamides and a process for the preparation of the same.

The known monosubstituted cyanamides, such as methyl-, ethyl-, allyl-, and phenylcyanamides, are substantially neutral compounds which are extremely difficult to isolate in monomeric form because of their strong tendency to form trimers. The present invention provides monosubstituted cyanamides in which the remaining hydrogen of the cyanamide group is strongly acidic in nature. The invention also embraces the corresponding salts which are readily formed, due to the strong acidity of the parent compounds.

There have now been produced β-cyanovinylcyanamides and their salts and a process for their preparation which involves the reaction of a β-cyanovinyl halide, ether, or thioether with an alkali-metal cyanamide.

The products of this invention are the β-cyanovinylcyanamides in which the remaining α- and β-positions in the vinyl group may be hydrogen or may be substituted by cyano, halogen, alkoxy, monohydroxyalkoxy, or alkylthio (in which the alkyl group contains at least two carbon atoms; on α-carbon only) and the corresponding salts. These compounds may be represented by Formula I:

$$\left[\begin{array}{c} X\\ \diagdown\\ NC \end{array} C=C \begin{array}{c} Y\\ \diagup\\ \ominus N-CN \end{array}\right]_n M^{(n+)}$$

I

In this formula: X and Y, which may generally be alike or different, may be hydrogen, cyano, halogen, alkoxy or hydroxyalkoxy, but, in addition, Y may be alkylthio of at least two carbon atoms; M may be any cation, such as hydrogen, metal, ammonium, sulfonium, phosphonium, arsonium, stibonium, and the like; and $(n+)$ is the valence of the cation while $n$ is the number of anions present in the molecule. In the definition of M, by "metal" is meant an element having an atomic number of 3, 4, 11–13, 19–32, 37–51, 55–84, 87–101, and above. The preferred embodiments for M are hydrogen, a metal, ammonium, substituted (quaternary) ammonium in which the substituents are alkyl (18 carbon atoms or less) or phenyl and substituted sulfonium, phosphonium, arsonium or stibonium in which the substituents are lower alkyl (6 carbon atoms or less) or phenyl.

The process of this invention involves the reaction of a β-cyanovinyl compound of the formula

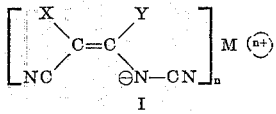

II in which Q is a halogen atom, i.e., fluorine, chlorine, bromine, or iodine, an alkoxy group, or an alkylthio group, X is as defined above and Y' is the same as Y as defined above with the additional proviso that Y' and Q, taken together, may form with the carbon to which they are attached a 1,3-dioxolane ring or a 1,3-dioxane ring, with an alkali metal cyanamide of the formula M'NHCN, in which M' is an alkali metal, i.e., Li, Na, K, Rb, or Cs.

In the compounds described above, the alkyl radicals in the alkoxy and hydroxyalkoxy groups may be any saturated alkyl group, including cycloalkyl, containing as many as 18 carbon atoms. In the alkylthio groups the alkyl radical may contain 2–18 carbon atoms. Thus the alkyl moieties may include isopropyl, n-butyl, tert-butyl, octyl, decyl, dodecyl, stearyl, cyclopropyl, cyclobutyl, cyclohexyl, tetramethylcyclohexyl, and the like.

Of the hydroxyalkoxy compounds it will be seen that the 2-hydroxyalkoxy and 3-hydroxyalkoxy compounds may be obtained directly and are therefore preferred. Other hydroxyalkoxy compounds are prepared by syntheses involving hydroxyalkoxy substituted β-cyanovinyl halides.

When the above reactants are brought together, there is first formed a mixture of compounds of the formulas:

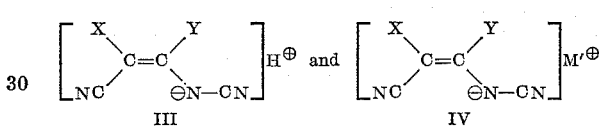

in which X, Y, and M' are as defined above. An excess of the alkali metal cyanamide in the reaction mixture favors the formation of compounds of Formula IV. The other compounds embraced by Formula I are readily prepared from compounds of Formulas III or IV by metathesis with the corresponding oxides, bases, or salts. For example, the free acid β-cyanovinylcyanamide compounds of Formula III are readily obtained by passage of compounds of Formula IV or a mixture of compounds of Formulas III and IV through an ion-exchange column in acid form. Alternatively, compound III may be reacted with metal oxides or hydroxides, as well as with amines, sulfides, phosphines, arsines, or stibines to yield the corresponding metallic and onium salts. These salts may be converted in turn to other salts by further metathetical reactions. For example, compounds of Formula III react readily with barium oxide or barium hydroxide to yield the corresponding barium salts. Aqueous solutions of these salts are useful for preparing other salts of these acids by reacting with aqueous solutions of the corresponding sulfates. In such a reaction, barium sulfate is precipitated quantitatively as a by-product and is readily filtered off, leaving a solution of the salt of the cation which was introduced in the form of a sulfate. In this way, compounds of Formula I, where M is one equivalent of barium, react with aqueous solutions of the sulfates of $Al^{+++}$, $Ce^{++++}$, $Cs^+$, $Cr^{++}$, $Cr^{+++}$, $Co^{++}$, $Co^{+++}$, $Cu^{++}$, $Fe^{++}$, $Fe^{+++}$, $Ga^{+++}$, $In^{+++}$, $Ni^{++}$, $Li^+$, $K^+$, $Mn^{++}$, $Rb^+$, $Sn^{++}$, $Sn^{++++}$, $Th^{++++}$, $UO_2^{++}$, $VO^+$, $Zn^{++}$, $Zr^{++++}$, $NH_4^+$, $C_6H_5NH_3^+$, $(C_2H_5)_2NH_2^+$, $(CH_3)_3NH^+$, $(CH_3)_3S^+$, $(C_6H_5)_4P^+$, $(C_6H_5)_4As^+$, and $(CH)_4Sb^+$ to yield the corresponding metal, ammonium, sulfonium, phosphonium, arsonium, or stibonium salts of the β-cyanovinylcyanamide.

In the formulas shown above for the products of this invention (I, III, and IV), the convention has been adopted of expressing the charge on the cyanovinylcyanamide ion as associated with the nitrogen of the cyanamide group. It should be recognized that these ions are resonant structures and that the charge might be visualized as associated with other atoms in the molecule as, for example, the β-carbon atom of the vinyl group.

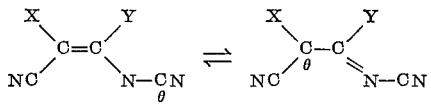

There follow some nonlimiting examples illustrating the compositions and processes of the invention in more detail. In these examples, parts are by weight unless otherwise specified.

*Example 1.—Tetramethylammonium tricyanovinylcyanamide*

To a stirred solution of 137 parts of tricyanovinyl chloride (U.S. 2,942,022) in 1,2-dimethoxyethane at 0° C. is added 64 parts of sodium cyanamide. The mixture is stirred 0.16 hour at 0° C., 1.45 hours at room temperature, and then 0.3 hour at 40–50° C. Evaporation of the dimethoxyethane under reduced pressure leaves a mixture of tricyanovinylcyanamide and sodium tricyanovinylcyanamide in the form of a red-brown oil. This is dissolved in 2000 parts of water and added to a solution of 500 parts of tetramethylammonium chloride in 1000 parts of water. A precipitate forms immediately. The mixture is heated at 80–100° C. to effect solution, filtered hot and the filtrate cooled to 0° C. The precipitate which forms is collected by filtration, dissolved in a minimum amount of hot water, treated with activated carbon and filtered hot. The filtrate is cooled and the crystals which separate are collected by filtration and air dried to yield 60 parts of tetramethylammonium tricyanovinylcyanamide in the form of bright yellow needles melting at 229–231° C.

*Analysis.*—Calcd. for $C_{10}H_{12}N_6$: C, 55.60; H, 5.56; N, 38.85. Found: C, 55.80, 56.04; H, 5.41, 5.38; N, 38.24, 38.44.

*Example 2.—Tetramethylammonium β-chloro-α,β-dicyanovinylcyanamide*

To a solution of 147 parts of dichlorofumaronitrile in about 1330 parts of tetrahydrofuran is added 256 parts of sodium cyanamide. The mixture is stirred for three hours at reflux temperature, cooled, and filtered to remove sodium chloride which precipitates. The precipitate is washed with tetrahydrofuran and the washings combined with the filtrate which is then evaporated at reduced pressure to leave a mixture of β-chloro-α,β-dicyanovinylcyanamide and sodium β-chloro-α,β-dicyanovinylcyanamide in the form of a red solid. This is dissolved in 500 parts of water and added to a solution of 500 parts of tetramethylammonium chloride in 1000 parts of water. The mixture is warmed at 80–100° C. and then cooled and the crystalline product is separated by filtration. It is treated with activated carbon in ethanol and recrystallized from ethanol to yield 160 parts of tetramethylammonium β-chloro-α,β-dicyanovinylcyanamide in the form of pale yellow needles melting at 154° C. This product is stored in the dark as it is very light-sensitive and turns dark brown on exposure to sunlight.

*Analysis.*—Calcd. for $C_9H_{12}N_5Cl$: C, 48.00; H, 5.32; N, 31.0; Cl, 15.7. Found: C, 48.25, 48.48; H, 5.46, 5.61; N, 30.84, 30.99; Cl, 15.24.

*Example 3.—Tetramethylammonium α-chloro-β,β-dicyanovinylcyanamide*

To a solution of 147 parts of 1,1-dichloro-2,2-dicyanoethylene in 2220 parts of 1,2-dimethoxyethane is added 256 parts of sodium cyanamide with stirring. An exothermic reaction occurs. When this subsides, the mixture is stirred 1.5 hours at room temperature and then filtered to remove sodium chloride which precipitates. The precipitate is washed with 1,2-dimethoxyethane and the washings combined with the filtrate which is then evaporated to dryness to yield a yellow oil which on trituration with a trace of ether gives 180 parts of a mixture of α-chloro-β,β-dicyanovinylcyanamide and sodium α-chloro-β,β-dicyanovinylcyanamide in the form of pale yellow crystals. This product is taken up in about 300 parts of water and treated with a solution of 200 parts of tetramethylammonium chloride in 400 parts of water. The mixture is heated to effect solution and filtered hot. The needles which form on cooling the filtrate are separated and dissolved in a minimum amount of hot water, treated with activated carbon, and filtered hot. The filtrate is cooled and the needles which form are collected by filtration to yield 158 parts of tetramethylammonium α-chloro-β,β-dicyanovinylcyanamide in the form of off-white needles which melt with decomposition at 180–180.5° C.

*Analysis.*—Calcd. for $C_9H_{12}N_5Cl$: C, 48.00; H, 5.33; N, 31.00; Cl, 15.71. Found: C, 48.29, 48.26; H, 5.85, 5.56; N, 29.70, 29.85; Cl, 15.58, 15.44.

*Example 4.—Tetramethylammonium β,β-dicyano-α-ethoxyvinylcyanamide*

To a solution of 644 parts of dicyanoketene diethyl acetal (Middleton et al., J. Am. Chem. Soc., 80, 2793 [1958]) in 4440 parts of tetrahydrofuran is added 256 parts of sodium cyanamide and about 1580 parts of absolute ethanol. The mixture is warmed at about 80° C. to effect complete solution and then evaporated to dryness to leave as a crystalline residue a mixture of β,β-dicyano-α-ethoxyvinylcyanamide and sodium β,β-dicyano-α-ethoxyvinylcyanamide. This residue is dissolved in a minimal amount of water and treated with an excess of concentrated aqueous tetraethylammonium bromide solution. The resulting solution is evaporated to dryness and the residue is extracted with five 4500-part portions of ethyl acetate. The combined ethyl acetate washings are evaporated to dryness and the residue recrystallized from 4500 parts of ethyl acetate to yield 690 parts of crystalline tetraethylammonium β,β - dicyano-α-ethoxyvinylcyanamide melting at 73.8–74.5° C.

*Analysis.*—Calcd. for $C_{15}H_{25}N_5O$: C, 61.8; H, 8.6; N, 24.0. Found: C, 61.75, 61.92; H, 8.79, 8.85; N, 23.94, 24.00.

*Example 5.—Sodium β,β-dicyano-α-(β-hydroxyethoxy)vinylcyanamide*

To a solution of 327 parts of dicyanoketene ethyleneacetal (Heckert et al., U.S. 2,980,698) in 2220 parts of tetrahydrofuran is added 153 parts of sodium cyanamide and 790 parts of absolute ethanol. A mildly exothermic reaction ensues. The resulting solution is evaporated to dryness at 80–100° C. and the residue is recrystallized from ethanol to yield 380 parts of sodium β,β - dicyano-α-(β-hydroxyethoxy)vinylcyanamide in the form of crystals melting at 186–192° C.

*Analysis.*—Calcd. for $C_7H_5O_2N_4Na$: C, 42.0; H, 2.5; N, 28.0. Found: C, 42.57, 42.03; H, 2.80, 2.61; N, 28.98, 28.99.

*Example 6.—Tetramethylammonium β,β-dicyanovinylcyanamide*

To a solution of 610 parts of 1,1-dicyano-2-ethoxyethylene in 4440 parts of tetrahydrofuran is added 320 parts of sodium cyanamide and 1580 parts of absolute alcohol. A mildly exothermic reaction ensues. The mixture is warmed at about 80° C. to effect complete solution and then evaporated to dryness to leave as a crystalline residue a mixture of $\beta,\beta$-dicyanovinylcyanamide and sodium $\beta,\beta$-dicyanovinylcyanamide. The residue is dissolved in a minimal amount of water and treated with an excess of a concentrated aqueous solution of tetramethylammonium chloride. The resulting solution is evaporated to dryness and the residue is extracted with three 9000-part portions of ethyl acetate. The combined ethyl acetate washings are concentrated by distillation until crystallization occurs. The crystals are collected by filtration to give 450 parts of tetramethylammonium $\beta,\beta$-dicyanovinylcyanamide melting at 117.5–119° C.

*Analysis.*—Calcd. for $C_9H_{13}N_5$: C, 56.5; H, 6.8; N, 36.7. Found: C, 56.75, 56.73; H, 7.11, 6.97; N, 39.14, 39.17.

*Example 7.—Tetramethylammonium $\beta,\beta$-dicyano-$\alpha$-ethylthiovinylcyanamide*

To a solution of 870 parts of 1,1-dicyano-2,2-di(ethylthio)ethylene in 3950 parts of absolute alcohol is added 320 parts of sodium cyanamide. An exothermic reaction ensues. The mixture is heated at about 80° C. for one hour and then the alcohol evaporated, leaving a solid mixture of $\beta,\beta$-dicyano-$\alpha$-ethylthiovinylcyanamide and sodium $\beta,\beta$-dicyano-$\alpha$-ethylthiovinylcyanamide. The residual solid is dissolved in a minimal amount of water and treated with an excess of a concentrated aqueous solution of tetramethylammonium chloride. The crystals which form are filtered and recrystallized from water to give 600 parts of tetramethylammonium $\beta,\beta$-dicyano-$\alpha$-ethylthiovinylcyanamide melting at 125.5–127° C.

*Analysis.*—Calcd. for $C_{11}H_{17}N_5S$: C, 52.6; H, 6.8; N, 27.9; S, 12.7. Found: C, 52.98, 53.09; H, 7.02, 7.01; N, 27.28, 27.96; S, 11.79, 11.90.

*Example 8.—Acid form of $\beta$-cyanovinylcyanamides*

This example illustrates the formation of the free acid form of the $\beta$-cyanovinylcyanamides from their salts:

An ion-exchange column is rendered acidic by thorough treatment with aqueous hydrochloric acid and then washed with water until the eluent is neutral. A concentrated aqueous solution containing 50 parts of tetramethylammonium $\beta,\beta$-dicyano-$\alpha$-ethylthiovinylcyanamide is passed through the column. The eluent is a colorless aqueous solution of $\beta,\beta$-dicyano-$\alpha$-ethylthiovinylcyanamide which is found to be intensely acidic, pH=1. The presence of the free acid is confirmed by treating the eluent with a concentrated aqueous solution of tetramethylammonium chloride. The crystals which form are separated by filtrated to yield 32 parts of tetramethylammonium $\beta,\beta$-dicyano-$\alpha$-ethylthiovinylcyanamide which melts at 126.5–127.5° C. and is shown by its infrared absorption spectrum to be identical with the corresponding salt shown in Example 7.

*Example 9.—Octadecyltrimethylammonium $\beta$-chloro-$\alpha,\beta$-dicyanovinylcyanamide*

To a solution of 0.45 part of tetramethylammonium $\beta$-chloro-$\alpha,\beta$-dicyanovinylcyanamide in 20 parts of water is added a solution of 0.8 part of octadecyltrimethylammonium bromide in 20 parts of water. The mixture is filtered to give 0.85 part of octadecyltrimethylammonium $\beta$-chloro-$\alpha,\beta$-dicyanovinylcyanamide as a pale yellow microcrystalline solid, M.P. 64–65° C.

*Example 10.—Octadecyltrimethylammonium $\beta,\beta$-dicyano-$\alpha$-ethylthiovinylcyanamide*

To a mixture of 2.51 parts of tetramethylammonium $\beta,\beta$-dicyano-$\alpha$-ethylthiovinylcyanamide and 3.92 parts of octadecyltrimethylammonium bromide is added 100 parts of water. The mixture is heated to boiling and then cooled and extracted with 50 parts of ethyl acetate. The ethyl acetate extract is dried over anhydrous magnesium sulfate, filtered and the ethyl acetate evaporated to leave octadecyltrimethylammonium $\beta,\beta$ - dicyano-$\alpha$-ethylthiovinylcyanamide as pale yellow needles, M.P. 55–56° C.

*Example 11.—Octadecyltrimethylammonium $\beta,\beta$-dicyanovinylcyanamide*

To a mixture of 1.3 parts of tetramethylammonium $\beta,\beta$-dicyanovinylcyanamide and 2.66 parts of octadecyltrimethylammonium bromide is added 66 parts of water and the mixture heated to boiling. On cooling, crystals separate and are collected on a filter. The crystals are dissolved in 50 parts of ethyl acetate, dried over anhydrous magnesium sulfate, filtered and the ethyl acetate evaporated to leave 2.5 parts of octadecyltrimethylammonium $\beta,\beta$-dicyanovinylcyanamide as pale yellow needles, M.P. 75.5–76.2° C.

*Example 12.—Octadecyltrimethylammonium $\beta,\beta$-dicyano-$\alpha$-ethoxyvinylcyanamide*

To a solution of 4.4 parts of dicyanoketenediethylacetal in 40 parts of ethyl alcohol is added 1.7 parts of sodium cyanamide. The mixture is heated at reflux and then the alcohol evaporated. The crude sodium $\beta,\beta$-dicyano-$\alpha$-ethoxyvinylcyanamide is dissolved in 300 parts of water, treated with 10.4 parts of octadecyltrimethylammonium bromide and the mixture heated to boiling. On cooling, crystals separate and are collected on a filter. The crystals are purified by recrystallization from a mixture of ethyl acetate and hexane to give 11.1 parts of octadecyltrimethylammonium $\beta,\beta$-dicyano-$\alpha$-ethoxyvinylcyanamide as colorless plates, M.P. 57–58° C.

*Example 13.—Octadecyltrimethylammonium $\beta,\beta$-dicyano-$\alpha$-($\beta$-hydroxyethoxy)vinylcyanamide*

A solution of 14 parts of sodium $\beta,\beta$-dicyano-$\alpha$-($\beta$-hydroxyethoxy)vinylcyanamide in 50 parts of water is added to a warm solution of 19.5 parts octadecyltrimethylammonium bromide in 300 parts of water. On cooling, crystals separate and are collected by filtration, recrystallized from ethyl acetate-hexane to give 12.7 parts of octadecyltrimethylammonium $\beta,\beta$-dicyano-$\alpha$-($\beta$-hydroxyethoxy)vinylcyanamide as white plates.

*Example 14.—Dioctadecyldimethylammonium $\beta,\beta$-dicyano-$\alpha$-ethoxyvinylcyanamide*

To a hot slurry of 52.5 parts of dioctadecyldimethylammonium chloride in 500 parts of water is added a solution of 18.3 parts of sodium $\beta,\beta$-dicyano-$\alpha$-ethoxyvinylcyanamide in 50 parts of water. The mixture is heated at reflux, cooled and extracted with 200 parts of ethyl acetate. The ethyl acetate extract is dried over magnesium sulfate, filtered and the ethyl acetate evaporated to leave 49.4 parts of dioctadecyldimethylammonium $\beta,\beta$-dicyano-$\alpha$-ethoxyvinylcyanamide as a pale yellow wax.

*Analysis.*—Calcd. for $C_{45}H_{85}N_5O$: C, 76.0; H, 11.9; N, 9.9. Found: C, 75.0; H, 11.8; N, 9.9.

When the $\beta$-cyanovinyl compounds indicated in the table below are substituted for tricyanovinyl chloride and treated with sodium cyanamide in the procedure of Example 1, the indicated $\beta$-cyanovinylcyanamide product is obtained. Only the free acid form of the product is indicated in the table, it being understood that according to the procedure of Example 1 the sodium and tetramethylammonium salts are also obtained and that these in turn may yield by methathesis the corresponding barium salt which by the sulfate reaction discussed above may be used to prepare the other salts indicated.

TABLE

| β-Cyanovinyl starting material | β-Cyanovinylcyanamide product |
|---|---|
| Monochlorofumaronitrile (H, CN / NC, Cl on C=C) | β,α-Dicyanovinylcyanamide (H, CN / NC, NH—CN on C=C) |
| Trifluoroacrylonitrile (F, F / NC, F on C=C) | β-Cyano-α,β-difluorovinylcyanamide (F, F / NC, NH—CN on C=C) |
| 3-bromoacrylonitrile (H, H / NC, Br on C=C) | β-Cyanovinylcyanamide (H, H / NC, NH—CN on C=C) |
| 2,3-diiodoacrylonitrile (I, H / NC, I on C=C) | β-Cyano-β-iodovinylcyanamide (I, H / NC, NH—CN on C=C) |
| 2-dicyanomethylene-4,5-di-n-propyl-1,3-dioxolane (NC, NC / O—CH—CH$_2$—CH$_2$—CH$_3$ and O—CH—CH$_2$—CH$_2$—CH$_3$ on C=C) | β,β-Dicyano-α-(1,2-di-n-propyl-2-hydroxyethoxy)vinylcyanamide (NC, NC / O—CH(C$_3$H$_7$)—CH(C$_3$H$_7$)OH, NH—CN on C=C) |
| 2-dicyanomethylene-4,4,6-trimethyl-1,3-dioxane (NC, NC / O—C(CH$_3$)$_2$—CH$_2$—CH(CH$_3$)—O on C=C) | β,β-Dicyano-α-(1,1,3-trimethyl-3-hydroxypropoxy)-vinylcyanamide (NC, NC / O—C(CH$_3$)$_2$—CH$_2$—CH(CH$_3$)OH, NH—CN on C=C) |
| 3-ethoxyacrylonitrile (H, H / NC, O—CH$_2$—CH$_3$ on C=C) | β-Cyanovinylcyanamide (H, H / NC, NH—CN on C=C) |
| 2,3-diethoxyacrylonitrile (H$_3$C—CH$_2$—O, H / NC, O—CH$_2$—CH$_3$ on C=C) | β-Cyano-β-ethoxyvinylcyanamide (H$_3$C—CH$_2$—O, H / NC, NH—CN on C=C) |
| 3,3-dimethoxyacrylonitrile (H, O—CH$_3$ / NC, O—CH$_3$ on C=C) | β-Cyano-α-methoxyvinylcyanamide (H, O—CH$_3$ / NC, NH—CN on C=C) |

The present β-cyanovinylcyanamides and the salts thereof are useful as solid fuel rocket propellants when combined in suitable proportions with solid oxidants in the manner known in the art. Such utility is shown in Examples A and B:

*Example A.*—A test rocket is prepared by placing a mixture of one part tetramethylammonium β,β-dicyanovinylcyanamide and one part powdered potassium perchlorate in a thin-walled aluminum tube ¼″ x 3″, closed at one end. The packed tube is suspended horizontally. The propellant mixture at the open end is ignited with a gas flame, resulting in a strong horizontal propulsion of the tube in the direction of the closed end. A yellow-blue flame exits the open end.

*Example B.*—When Example A is substantially repeated except that octadecyltrimethylamminoum β,β-dicyano-α-ethoxyvinylcyanamide is substituted for tetramethylammonium β,β-dicyanovinylcyanamide, essentially the same results are obtained.

Since obvious modifications and equivalents in the invention will be evident to those skilled in the chemical arts, I propose to be bound solely by the appended claims.

The embodiments of the invention in which an exclusive property or privilege is claimed are defined as follows:

1. Compounds of the formula

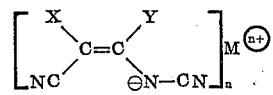

wherein:
X is selected from the group consisting of hydrogen, cyano, halogen, alkoxy of up to 18 carbons and monohydroxyalkoxy of up to 18 carbons;
Y is selected from the group consisting of hydrogen, cyano, halogen, alkoxy of up to 18 carbons, monohydroxyalkoxy of up to 18 carbons and alkylthio of 2–18 carbons;

M is selected from the group consisting of hydrogen, a metal, ammonium and substituted ammonium in which any substituent is selected from the group consisting of alkyl of up to 18 carbons and phenyl, and sulfonium, phosphonium, arsonium, stibonium and substituted sulfonium, phosphonium, arsonium and stibonium in which any substituent is selected from the group consisting of lower alkyl and phenyl; and ⊕ is the valence of the cation while $n$ is the number of anions present in the molecule.

2. Tricyanovinylcyanamide.

3. A substituted-ammonium salt of tricyanovinylcyanamide wherein any substituent in the ammonium radical is alkyl of up to 18 carbons.

4. β-Chloro-α,β-dicyanovinylcyanamide.

5. A substituted ammonium salt of β-chloro-α,β-dicyanovinylcyanamide wherein any substituent in the ammonium radical is alkyl of up to 18 carbons.

6. Octadecyltrimethylammonium β-chloro-α,β-dicyanovinylcyanamide.

7. α-Chloro-β,β-dicyanovinylcyanamide.

8. A substituted-ammonium salt of α-chloro-β,β-dicyanovinylcyanamide wherein any substituent in the ammonium radical is alkyl of up to 18 carbons.

9. β,β-Dicyano-α-ethoxyvinylcyanamide.

10. A substituted-ammonium salt of β,β-dicyano-α-ethoxyvinylcyanamide wherein any substituent in the ammonium radical is alkyl of up to 18 carbons.

11. Octadecyltrimethylammonium β,β-dicyano-α-ethoxyvinylcyanamide.

12. Dioctadecyldimethylammonium β,β-dicyano-α-ethoxyvinylcyanamide.

13. β,β-Dicyano-α-(β-hydroxyethoxy)vinylcyanamide.

14. A substituted-ammonium salt of β,β-dicyano-α-(β-hydroxyethoxy)vinylcyanamide wherein any substituent in the ammonium radical is alkyl of up to 18 carbons.

15. Octadecyltrimethylammonium β,β-dicyano-α-(β-hydroxyethoxy)vinylcyanamide.

16. β,β-Dicyanovinylcyanamide.

17. A substituted-ammonium salt of β,β-dicyanovinylcyanamide wherein any substituent in the ammonium radical is alkyl of up to 18 carbons.

18. Octadecyltrimethylammonium β,β-dicyanovinylcyanamide.

19. β,β-Dicyano-α-ethylthiovinylcyanamide.

20. A substituted-ammonium salt of β,β-dicyano-α-ethylthiovinylcyanamide wherein any substituent in the ammonium radical is alkyl of up to 18 carbons.

21. Octadecyltrimethylammonium β,β-dicyano-α-ethylthiovinylcyanamide.

22. The process of forming a compound of claim 1 which comprises reacting, at a temperature of about 0–100° C., a reactant system consisting essentially of (A) a cyanamide of the formula M′NHCN in which M′ is an alkali metal and (B) a β-cyanovinyl compound of the formula

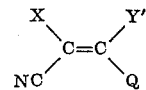

wherein:
Q is selected from the group consisting of halogen, alkoxy of up to 18 carbons and alkylthio of 2–18 carbons;
X is selected from the group consisting of hydrogen, cyano, halogen, alkoxy of up to 18 carbons and monohydroxyalkoxy of up to 18 carbons; and
Y′ is selected from the group consisting of hydrogen, cyano, halogen, alkoxy of up to 18 carbons, monohydroxyalkoxy of up to 18 carbons and alkylthio of 2–18 carbons with the proviso that Y′ and Q may be joined to form with the carbon to which they are attached a ring of the group consisting of 1,3-dioxane and 1,3-dioxolane rings.

23. The process for the preparation of tricyanovinylcyanamide which comprises reacting together an alkali metal cyanamide and tricyanovinyl chloride at a temperature of 0–100° C.

24. The process for the preparation of β-chloro-α,β-dicyanovinylcyanamide which comprises reacting together an alkali metal cyanamide and dichlorofumaronitrile at a temperature of 0–100° C.

25. The process for the preparation of α-chloro-β,β-dicyanovinylcyanamide which comprises reacting together an alkali metal cyanamide and 1,1-dichloro-2,2-dicyanoethylene at a temperature of 0–100° C.

26. The process for the prepartion of β,β-dicyano-α-ethylthiovinylcyanamide which comprises reacting together an alkali metal cyanamide and 1,1-dicyano-2,2-di(ethylthio)-ethylene at a temperature of 0–100° C.

No references cited.

CHARLES B. PARKER, *Primary Examiner.*

J. P. BRUST, *Assistant Examiner.*